(12) United States Patent
Messerschmidt et al.

(10) Patent No.: US 7,482,296 B2
(45) Date of Patent: Jan. 27, 2009

(54) ALUMINOBOROSILICATE GLASS AND METHOD FOR THE PRODUCTION OF CRYSTALLITE-FREE GRADIENT INDEX LENSES

(75) Inventors: Bernhard Messerschmidt, Jena (DE); Christian Ruessel, Jena-Cospeda (DE); Sandra Hornschuh, Jena (DE); Torsten Possner, Jena (DE); Ulf Possner, Jena (DE)

(73) Assignee: Grintech GmbH, Jena (DE)

( * ) Notice: Subject to any disclaimer, the term of this patent is extended or adjusted under 35 U.S.C. 154(b) by 570 days.

(21) Appl. No.: 11/015,774

(22) Filed: Dec. 17, 2004

(65) Prior Publication Data

US 2005/0137075 A1 Jun. 23, 2005

(30) Foreign Application Priority Data

Dec. 19, 2003 (DE) ................. 103 61 555

(51) Int. Cl.
- C03C 4/00 (2006.01)
- C03C 3/062 (2006.01)
- C03C 3/064 (2006.01)
- C03C 3/066 (2006.01)
- C03C 15/00 (2006.01)
- C03C 19/00 (2006.01)
- G02B 26/08 (2006.01)

(52) U.S. Cl. .............. 501/77; 501/13; 501/73; 501/79; 65/30.13; 359/196

(58) Field of Classification Search .......... 501/13, 501/73, 77, 79

See application file for complete search history.

(56) References Cited

U.S. PATENT DOCUMENTS

| | | | |
|---|---|---|---|
| 4,902,330 A | 2/1990 | Sakai et al. | |
| 5,007,948 A | 4/1991 | Araujo | |
| 6,066,273 A * | 5/2000 | Yamaguchi et al. | ......... 252/585 |
| 6,511,932 B2 | 1/2003 | Yamaguchi et al. | |
| 2003/0045420 A1 | 3/2003 | Koyama et al. | |

FOREIGN PATENT DOCUMENTS

| | | |
|---|---|---|
| DE | 269 615 | 9/1985 |
| DE | 38 03 420 | 8/1989 |
| DE | 102 09 612 | 10/2002 |
| EP | 0 918 235 | 5/1999 |
| EP | 1 106 586 | 6/2001 |
| WO | WO 02/14233 | 2/2002 |

OTHER PUBLICATIONS

Derwent Abstract 1989-242292, English Abstract of DE 38 03 420 A1.*
Journal of Non-Crystalline Solids 347 (2004) pp. 121-127 "Silver ion exchange in glasses of the system $Na_2O/Al_2O_3/B_2O_3/SiO_2$" Hornschuh, et al.

* cited by examiner

Primary Examiner—J. A. Lorengo
Assistant Examiner—Elizabeth A Bolden
(74) Attorney, Agent, or Firm—Reed Smith LLP

(57) ABSTRACT

The invention is directed to an aluminoborosilicate glass containing alkali metals for the production of optical components with refractive index gradients which are generated by ion exchange of monovalent metal ions in a base glass comprising at least silicon oxide, boron oxide, aluminum oxide and an alkali metal oxide, particularly for the production of gradient index lenses (GRIN lenses). The object of the invention, to find a novel possibility for producing GRIN lenses based on aluminoborosilicate glasses in which the glass has an appreciably reduced tendency toward crystallization in subsequent thermal treatment processes, is met according to the invention in an alkali-containing aluminoborosilicate glass for the production of optical components with refractive index gradients generated by ion exchange of monovalent, refractive index-changing metal ions in a base glass of $SiO_2$, $Al_2O_3$, a metal-(III)-oxide (of B and/or Ga) and at least one metal-(I)-oxide (of Li, Na, K and/or Rb) in that defined molar ratios of metal-(III)-oxides to the metal-(I)-oxides of the base glass are adjusted within a given range in order to appreciably reduce the tendency toward crystallization of the glass for subsequent thermal treatment processes. Point defects caused by crystallites in the GRIN lenses produced in this manner are drastically reduced in this way.

48 Claims, No Drawings

ALUMINOBOROSILICATE GLASS AND METHOD FOR THE PRODUCTION OF CRYSTALLITE-FREE GRADIENT INDEX LENSES

CROSS-REFERENCE TO RELATED APPLICATION

This application claims priority of German Application No. 103 61 555.5, filed Dec. 19, 2003, the complete disclosure of which is hereby incorporated by reference.

BACKGROUND OF THE INVENTION a) Field of the Invention

The invention is directed to an aluminoborosilicate glass containing alkali metals and at least a partial volume of silver ions that are introduced into a base glass of silicon oxide, boron oxide, aluminum oxide and at least one alkali metal oxide by ion exchange with alkali metal ions, particularly for gradient index lenses (GRIN lenses), and to a method for the production of GRIN lenses and other optical elements with an at least partially increased or reduced index of refraction.

b) Description of the Related Art

Numerous solutions are known from the prior art for producing gradient index lenses (GRIN lenses). The most effective solutions are based on borosilicate glasses which are suitable for ion exchange in order to increase or partially change the index of refraction.

For example, U.S. Pat. No. 4,902,330 describes a method for the production of GRIN lenses which is based on a two-step process of ion exchange. In the first step, an exchange of alkali metal ions is caused by introducing the starting glass into a melt with silver ions, thallium ions or lithium ions in order to increase the index of refraction uniformly. In the second phase, the introduction of silver ions in the glass from the first phase is partially cancelled through immersion in molten salt with sodium ions or potassium ions in order to generate a gradient of the index of refraction. This two-step process is described for phosphate silicate glasses and borosilicate glasses. For borosilicate glasses, an unwanted coloration by silver colloids is mentioned as disadvantageous.

A fundamental principle for generating differences in the index of refraction in glasses is described in DD 269 615 B5 which discloses glass compositions which are distinguished in that large differences in the index of refraction are achieved in that oxides of trivalent metals ($M'''_2O_3$, where $M'''$=B, Al, Ga) and oxides of monovalent metals ($M'_2O$, where $M'$=Li, K, Na, Rb) which are contained in the glass have a molar ratio of $\geq 1.0$ and a glass of this kind is brought into contact with silver, silver alloys, molten salt or solutions at temperature between 210° C. and 450° C. The coloring occurring in this process is described as minor. However, the tendency towards crystallization (nepheline) which occurs as a result of thermal shaping processes (rod drawing or float glass process) and which is noticeable as punctiform or chain defects in the GRIN lenses and generates imaging defects or scattered light is disadvantageous.

The teaching of U.S. Pat. No. 6,511,932 B2 is based on similar glass compositions, wherein glass compositions expanded by an obligatory addition of magnesium oxide (of up to 18 mole %) for the ion exchange between silver and alkali is claimed with the advantage of a reduced melt temperature. However, the addition of MgO worsens transmission and contributes to an increased tendency toward crystallization.

In U.S. Pat. No. 5,007,948, which relates to substantially colorless glasses containing silver through ion exchange, the glass has an atomic structure in which the proportion of non-bridging oxygen atoms is less than 0.03 for purposes of preventing coloration by the silver. It cannot be determined whether or not the tendency toward crystallization is also sufficiently reduced.

Further, for the production of GRIN lenses WO 02/14233 A1 describes alkali-free borosilicate glasses with a high silver content in which the high silver content (of at least two cation percent) is present in the base glass by means of block melt without the addition of alkali ions. The gradient of the index of refraction is generated by subsequent ion exchange in alkali-containing molten salt. It is not mentioned in, nor can it be determined from, this reference whether or not visible defects such as those caused by tendency toward crystallization in the glass, and so on, are sufficiently rare or can be excluded.

All of the aforementioned references with ion exchange between silver and alkali have the common drawback that point defects which interfere with imaging systems and illumination systems occur in the finished GRIN lenses when the base glass has a significant tendency to form crystallites or has increased growth as soon as thermal treatment processes (such as thermal shaping processes, e.g., rod drawing or ion exchange processes) are applied to the glass blanks that are solidified from the glass melt.

OBJECT AND SUMMARY OF THE INVENTION

It is a primary object of the invention to find a novel possibility for producing GRIN lenses based on aluminoborosilicate glasses in which the glass has an appreciably reduced tendency toward crystallization without a deterioration of the positive characteristics known for conventional borosilicate glasses, such as meltability at temperatures conventionally used in glassmaking (up to 600° C.), with good optical quality and a high refractive index gradient and without substantial coloration after the introduction of silver.

According to the invention, this object is met by an alkali-containing aluminoborosilicate glass containing in at least a part of its volume silver ions that are introduced through ion exchange with alkali ions in a base glass of the following composition:

$20 \leq SiO_2 \leq 50$ mole %
$10 \leq Al_2O_3 \leq 35$ mole %
$10 \leq B_2O_3 \leq 20$ mole %
$10 \leq M_2O \leq 34$ mole %, where M=Li, Na, K and/or Rb, wherein a molar ratio of aluminum oxide to metal-(I)-oxide is adjusted in the range of $$1 < \frac{Al_2O_3}{M_2O} < 1.3.$$

The base glass preferably has a molar ratio of $$1.05 \leq \frac{Al_2O_3}{M_2O} \leq 1.1.$$

In an alternative solution, the above-stated object is met by an alkali-containing aluminoborosilicate glass containing in at least a part of its volume silver ions that are introduced through ion exchange with alkali ions in a base glass of the following composition:

$20 \leq SiO_2 \leq 50$ mole %
$10 \leq Al_2O_3 \leq 35$ mole %
$10 \leq M'''_2O_3 \leq 20$ mole %, where $M'''_2$=B and/or Ga
$10 \leq M_2O \leq 34$ mole %, where M=Li, Na, K and/or Rb, wherein a molar ratio of metal-(III)-oxides to metal-(I)-oxides is adjusted in the range of $$1.5 < \frac{[Al_2O_3] + [M'''_2O_3]}{M_2O} < 2.$$

In addition to aluminum oxide, primarily boron and gallium can also be contained as trivalent metal oxides.

In all of the variants mentioned above, the base glass advisably contains between 15 and 30 mole % of $M_2O$, preferably $Na_2O$. Further, it may be advisable when the molten base glass already contains silver oxide in a concentration of up to 2 mole %.

Further, the above-stated object is met through an alkali-containing aluminoborosilicate glass of the following composition:

$20 \leq SiO_2 \leq 50$ mole %
$10 \leq Al_2O_3 \leq 35$ mole %
$10 \leq M'''_2O_3 \leq 20$ mole %, where $M'''$=B, Ga
$10 \leq M_2O \leq 34$ mole %, where M=Li, Na, K, Rb, wherein the monovalent metal oxides have a proportion of lithium dioxide between 10% and 80% and a molar ratio of metal-(III)-oxides to metal-(I)-oxides is adjusted in the range of $$1.5 < \frac{[Al_2O_3] + [M'''_2O_3]}{M_2O} < 2.$$

Alkali fluorides, one or more oxides and/or fluorides of the metals zinc, magnesium, calcium, strontium, barium, niobium and tantalum are advantageously melted in the base glass in concentrations of up to 3 mole % as additional admixtures for all of the aluminoborosilicate glasses described above.

Further, the object of the invention is met in a method for producing GRIN lenses and other optical elements with an at least partially increased index of refraction based on an aluminoborosilicate glass described above by the following sequence of steps:
melting a base glass of the indicated composition at temperatures of 1400° C.-1600° C. and homogenizing the molten glass,
casting the molten glass for producing semifinished articles for optical components,
shaping the semifinished articles to form blanks for the ion exchange, wherein the blanks are reduced to dimensions suitable for the ion exchange,
introducing silver ions by exchanging alkali ions by introducing the blanks at least once into a silver-containing molten salt at temperatures between 200° C. and 600° C. until a desired refractive index profile is adjusted.

The blanks are advantageously produced by cutting plates from square semifinished articles (bars of base glass) and subsequently grinding or polishing until achieving a height that is equal to or slightly greater than the definitive lens height perpendicular to the optical axis. In order to produce rotationally symmetric lenses it is advantageous to produce blanks from bar-shaped semifinished articles (cylinders) of the base glass by bar drawing at a temperature between 800° C. and 1000° C. and subsequent cutting, grinding or polishing until reaching a diameter that is equal to or slightly greater than the definitive lens diameter perpendicular to the optical axis.

In order to fabricate GRIN spherical lenses, the blanks are likewise advisably produced from a square semifinished article of base glass by cutting cubes and subsequently grinding and polishing until achieving a spherical shape whose diameter is equal to or slightly greater than the definitive lens diameter.

Another advantageous way to produce blanks for ion exchange consists in that the blanks are produced directly from the melt of the base glass by means of a float glass process at a temperature between 800° C. and 1600° C. at a plate height that is equal to or slightly greater than the final lens height perpendicular to the optical axis.

After the introduction of the silver ions, the blanks are preferably finished by cutting and subsequent grinding or polishing until the desired final lens dimensions are achieved perpendicular to and in the direction of the optical axis. The aluminoborosilicate glasses produced in this way are preferably used as GRIN dispersive lenses, wherein the blanks are possibly ground and polished to a suitable optical lens thickness in direction of the optical axis. However, optical components can also be formed during the introductions of silver such that their refractive index profile deviates from that of a conventional GRIN dispersive lens. The polished surfaces can be plane, concave or convex.

The above method is supplemented after the introduction of silver by at least one additional ion exchange process in an alkali-containing melt for producing GRIN focusing lenses in which there is a partial back-exchange of silver ions with monovalent metal ions, preferably sodium ions, after which the blanks are finished by cutting plates and subsequently grinding or polishing until achieving the desired definitive lens dimensions perpendicular to and in direction of the optical axis. The back-exchange of silver can advisably be carried out from a state of silver introduction (of the first ion exchange) which did not result in a homogeneous exchange equilibrium with an integrated increase in the level of the refractive index. However, this does not exclude blanks with a homogeneous refractive index level which were produced in the first ion exchange and which can also be used for optical components with an integrated refractive index increase as well as for the back-exchange of ions.

In another embodiment of the method for producing GRIN collecting lenses, the introduction of silver ions (through ion exchange) is replaced by the introduction of a substantial proportion of lithium ions as alkali ions in the melt of the base glass in order to increase the refractive index and the blanks generated from this are subjected to at least one ion exchange process in which a partial exchange of lithium ions with monovalent metal ions, preferably sodium ions, is carried out in an alkali-containing melt, after which the blanks are subsequently reduced in diameter until the desired definitive lens height is achieved perpendicular to the optical axis and by cutting and polishing until the definitive lens thickness is achieved in direction of the optical axis.

The aluminoborosilicate glasses generated by the above-mentioned ion exchange steps $Ag^+/M^+$ or $Li^+/M^+$ (where $M^+$ is preferably $Na^+$) are advantageously used as GRIN collecting lenses or are formed as optical components in such a way that their refractive index profile deviates from that of a conventional GRIN collecting lens and the blanks are possibly ground and polished to a suitable optical lens thickness in direction of the optical axis. These polished surfaces can be plane, concave or convex.

The divergent lenses or collecting lenses produced in accordance with the method are preferably used for beam shaping in laser diodes or as GRIN lenses for fiber-optic arrangements in communications technology or sensor technology. Further, there are advantageous applications as GRIN lenses for imaging ray paths and illumination beam paths in endoscopy or generally for optical scanning and imaging devices in medical engineering.

The core idea of the invention is based on the surprisingly discovered fact that the formation of crystallization defects which occurs in particular during thermal shaping processes (e.g., rod drawing) but also during solidification from the melt and during thermal ion exchange processes can be appreciably suppressed compared to a conventional aluminoborosilicate glass (e.g., according to DD 269 615 B5) when a molar ratio of the metal-(III)-oxides to metal-(I)-oxides, as was indicated above, or at least the molar ratio between aluminum oxide and the metal-(I)-oxides of the base glass is adjusted within a given range. Particularly in the production of GRIN lenses by ion exchange (preferably Ag/Na and Li/Na), this results in advantageous optical components which achieve large differences in the index of refraction (up to Δn=0.15) with high transmission (and low coloration) in the visible and NTR spectral regions along with mechanical and chemical stability.

The invention makes it possible to realize the production of GRIN lenses based on aluminoborosilicate glasses in which the base glass, particularly in the thermal treatment steps for generating higher refractive indices and refractive index gradients, has an appreciably reduced tendency toward crystallization while retaining the positive characteristics of conventional borosilicate glasses such as meltability at temperatures conventionally used in glassmaking (up to 1600° C.) with good optical quality and a high index of refraction after the introduction of silver without substantial coloration.

DESCRIPTION OF THE PREFERRED EMBODIMENTS

The invention will be explained more fully in the following with reference to a number of embodiment examples.

In a basic variant, the base glass according to the invention in which silver ions are to be introduced in at least a part of its volume through ion exchange with alkali ions is an alkali-containing aluminoborosilicate glass of the following composition:

$20 \leq SiO_2 \leq 50$ mole %
$10 \leq B_2O_3 \leq 20$ mole %
$10 \leq Al_2O_3 \leq 35$ mole %
$10 \leq M_2O \leq 34$ mole % (M=Li, Na, K, Rb), where the following molar ratio is to be maintained:

$$1 < \frac{Al_2O_3}{M_2O} < 1.3.$$

In a more general basic variant containing the same oxides, the ratio is considered from the proportions (mole %) of all contained oxides of trivalent metals with those of the monovalent metals and is adjusted to the following range:

$$1.5 < \frac{[Al_2O_3] + [B_2O_3]}{M_2O} < 2.$$

The method is shown first for the production of GRIN lenses and other optical elements with a generally increased index of refraction or refractive index gradient in its diverse possible application-specific method steps in order to illustrate more clearly the technical problem in the composition of aluminoborosilicate glasses in relation to the object of the invention.

A base glass of the composition described above (special glass mixture for producing GRIN components as is described in more detail in the following) is melted at temperatures between 1400° C. and 1600° C., homogenized and cast in suitable shapes of semifinished articles (bars, rods or balls). Depending on the type of optical components that are intended, ion exchange blanks which, as finished blanks, already have a suitable dimensioning of the optical element for the ion exchange are produced from the solidified semifinished articles. The production of the blanks for different specifications is carried out as follows.

a) GRIN Cylindrical Lenses

Glass plates are sawed from bars of the base glass (semifinished articles) and ground or polished in accordance with precision optics to a height that is equal to or slightly greater than the definitive lens height (perpendicular to the optical axis). Thermal processes by which glass plates with quasi-polished surfaces can be produced (e.g., float glass process) are also suitable for the production of glass plates.

b) GRIN Rod Lenses i) Semifinished articles are fashioned as cylindrical rods from the base glass after casting by grinding and polishing.

ii) These semifinished articles are (if necessary) made into rod-shaped blanks having a diameter adapted to the ion exchange process by means of a bar drawing process (similar to a glass fiber drawing process) at temperatures between 800° C. and 1000° C. This diameter conforms to the definitive lens diameter or is slightly greater so that post-treatment is possible after the ion exchange process.

The second process ii) is particularly critical with respect to unwanted crystallite formation because the typical temperature range for nucleation and growth processes of crystallites is traversed from low to higher temperatures. This means that the base glass which has cooled after the melting process is heated once again and passes through temperature ranges at which the speed of crystal nucleation is increased and, afterwards through at higher temperature ranges in which the crystal rate is high. Accordingly, particularly because of the thermal regimes of blank production by means of bar drawings, the base glass is in danger of forming crystallites that could appear as visible defects in the end product. However, crystallites can already exist in the base glass when the melt solidifies or can form or possibly grow in the subsequent ion exchange process.

c) GRIN Spherical Lenses i) Blanks in the form of cubes are made from the glass bars of the base glass in spherical shape by grinding and polishing, or ii) the blanks are shaped by direct shaping (e.g., drop method) from the melt and subsequently ground and polished to form balls.

A) In a first ion exchange process, the specially made blanks are immersed in silver-containing molten salt at temperatures between 200° C. and 600° C. In so doing, the M$^+$ ions in the glass (preferably Na$^+$) are exchanged with silver ions from the melt. The silver ion cause an increase in the index of refraction. The ion exchange is carried out in accordance with the laws of interdiffusion. A divergent lens effect occurs when a parabolic-refractive index profile is generated with the minimum index of refraction in the radial center of the rod or in the middle of the cross section of the plate. When this ion exchange process is carried out for a sufficient period of time, a global increase in the refractive index occurs because a determined exchange equilibrium between the exchange ions (e.g., $Na^+$ and $Ag^+$) is adjusted homogeneously in the glass. However, for special applications the introduction of silver is not continued up to the exchange equilibrium.

B) A second ion exchange process comprising at least one step (partial back-exchange of silver) must be carried out subsequent to the first ion exchange process in order to generate collecting lenses. For this purpose, the cylindrical bars or rectangular plates form the silver ion melt are immersed again in $Na^+$-containing molten salt and there results—likewise in accordance with the laws of interdiffusion—a partial back-exchange of the silver ions in the glass through sodium ions from the melt. When the process is conducted in a suitable manner, parabolic profiles result with the maximum index of refraction in the radial center of the bar rod or in the middle of the cross section of the plate. This results in a collecting lens effect with ray path.

The bars or plates (slabs) from ion exchange process A or from both exchange processes A and B are detached (sawed) in pieces of suitable size and subsequently ground and polished on the end faces in a plane-optical manner. This results in GRIN rod lenses or GRIN cylindrical lenses with plane optical end faces. Convex or concave end faces are also possibly produced in order to add a refractive lens effect.

Different advantageous constructions for the base glass according to the invention are described in the following first nine examples. A commercial reference glass of the following composition:

25 $Na_2O$.25 $Al_2O_3$.12.5 $B_2O_3$.37.5 $SiO_2$ (in mole %)

is used to test the crystallization tendency of the various embodiments of the base glass.

EXAMPLE 1

A glass composed of 25 $Na_2O$.25 $Al_2O_3$.12.5 $B_2O_3$.37.5 $SiO_2$ (in mole %) was melted at 1500° C. After temperature treatment for 1 hour at temperatures ≦850° C., no crystallization was evident. At temperatures of 900° C. and 950° C., the crystallization rate was about one fourth of the value of the reference glass.

EXAMPLE 2

A glass composed of 25 $Na_2O$.25 $Al_2O_3$.12.5 $B_2O_3$.37.5 $SiO_2$ showed no discernible crystallization in the temperature range of 700° C. to 950° C.

EXAMPLE 3

A glass composed of 24.5 $Na_2O$.1 NaF.30 $Al_2O_3$.12.5 $B_2O_3$.32.5 $SiO_2$ showed no crystallization at temperatures ≦850° C. With temperature treatment at 900° C. and 950° C. for 1 hour, the crystallization rate reached values of about one fifth of the reference glass.

EXAMPLE 4

A glass composed of 25 $Na_2O$.2.5 MgO.27.5 $Al_2O_3$.12.5 $B_2O_3$.32.5 $SiO_2$ showed no crystallization when heated in the range of 700° C. to 950° C.

EXAMPLE 5

A glass composed of 30 $Na_2O$.32.5 $Al_2O_3$.15 $B_2O_3$.22 $SiO_2$ showed no discernible crystallization after heating at temperatures <800° C. At temperatures ≧850° C., the crystallization rate was about one fourth of the value of the reference glass.

EXAMPLE 6

A glass composed of 30 $Na_2O$.30 $Al_2O_3$.20 $B_2O_3$.20 $SiO_2$ showed no crystallization at temperatures ≦850° C. At 900° C., the crystallization rate was about one sixth of the value of the reference glass. At 950° C., the crystallization rate was the same as that measured at 900° C., i.e., an increase in the crystallization rate with the temperature (as in the reference glass) was not observed.

EXAMPLE 7

A glass composed of 25 $Na_2O$.25 $Al_2O_3$.15 $B_2O_3$.35 $SiO_2$ showed no crystallization at temperatures ≦800° C. At 850° C., the crystallization rate was about one third of the value of the reference glass. At increased temperatures, the crystallization rate dropped again and reached 1/40th of the value of the reference glass at 950° C.

EXAMPLE 8

A glass composed of 20 $Na_2O$.22.5 $Al_2O_3$.12.5 $B_2O_3$.45 $SiO_2$ showed no crystallization when heated to temperatures up to 900° C.

EXAMPLE 9

A glass composed of 25 $Na_2O$.2.5 ZnO.27.5 $Al_2O_3$.12.5 $B_2O_3$.32.5 $SiO_2$ showed no crystallization when heated up to 850° C. At higher temperatures, the crystallization rate was about one fifth as high as that of the reference glass.

EXAMPLE 10

A glass composed of 20 $Na_2O$.5 $Li_2O$.27.5 $Al_2O_3$.12.5 $B_2O_3$.35 $SiO_2$ in which there was no introduction of silver (ion exchange with alkali ions) to raise the level of the refractive index but in which, instead, a high proportion of lithium oxide (20%) was already incorporated in the melt at the molar content of the monovalent metal oxides showed no discernible crystallization after heating to temperatures <750° C. At temperatures ≧750° C., the crystallization rate was about one third of the value of a reference glass which in this case had the composition 20 $Na_2O$.5 $Li_2O$.25 $Al_2O_3$.12.5 $B_2O_3$.37.5 $SiO_2$.

EXAMPLE 11

A glass composed of 10 $Na_2O$.15 $Li_2O$.27.5 $Al_2O_3$.12.5 $B_2O_3$.35 $SiO_2$ in which there was no introduction of silver (ion exchange with alkali ions) to raise the level of the refractive index but in which, instead, a high proportion of lithium oxide (75%) is already incorporated in the melt at the molar content of the monovalent metal oxides showed no crystallization when heated up to 900° C.

The scope of possible variations in the glass compositions and therefore the degree of gradients of the index of refraction that can be achieved by the ion exchange processes are in no way exhausted by the described method using the aluminoborosilicate glasses indicated above. Additional modifications of the composition of the base glass by further slight additions of metal oxides or metal fluorides which were not indicated herein or by exceeding the indicated range limits are likewise comprehended in the inventive teaching with the basic idea of the invention of adjusting a defined surplus of trivalent metal oxides (particularly aluminum oxide) in relation to the monovalent alkali metal oxides in order to suppress the crystallization tendency of the glass in the production of optical GRIN components.

While the foregoing description and drawings represent the present invention, it will be obvious to those skilled in the art that various changes may be made therein without departing from the true spirit and scope of the present invention.

What is claimed is:

1. Alkali-containing aluminoborosilicate glass for the production of optical components with refractive index gradients which are produced through ion exchange of monovalent metal ions in a base glass of the following composition:
   $20 \leq SiO_2 \leq 50$ mole %
   $10 \leq B_2O_3 \leq 20$ mole %
   $10 \leq Al_2O_3 \leq 35$ mole %
   $10 \leq M_2O \leq 34$ mole % (M=Li, Na, K, Rb),
   wherein a molar ratio of $$1 < \frac{Al_2O_3}{M_2O} < 1.3$$

is adjusted in order to reduce the tendency of the base glass toward crystallization for subsequent thermal treatment processes.

2. Aluminoborosilicate glass according to claim 1, wherein a molar ratio of $$1.05 \leq \frac{Al_2O_3}{M_2O} \leq 1.1$$

is adjusted in the melt of the base glass.

3. Aluminoborosilicate glass according to claim 1, wherein the base glass contains between 15 and 30 mole % of $M_2O$, preferably $Na_2O$.

4. Aluminoborosilicate glass according to claim 1, wherein the base glass further comprises $Ag_2O$ in a concentration of up to 2 mole %.

5. Aluminoborosilicate glass according to claim 1, wherein lithium oxide has a proportion between 10% and 80% of the monovalent metal oxides.

6. Aluminoborosilicate glass according to claim 1, wherein an alkali fluoride or at least one oxide or fluoride of the metals zinc, magnesium, calcium, strontium, barium, niobium and tantalum are contained as admixtures in the base glass in concentrations of up to 3 mole %, respectively.

7. Alkali-containing aluminoborosilicate glass for the production of optical components with refractive index gradients which are produced through ion exchange of monovalent metal ions in a base glass of the following composition:
   $20 \leq SiO_2 \leq 50$ mole %
   $10 \leq M'''_2O_3 \leq 20$ mole % (M'''=B, Ga)
   $10 \leq Al_2O_3 \leq 35$ mole %
   $10 \leq M_2O \leq 34$ mole % (M=Li, Na, K, Rb),
   wherein a molar ratio of $$1.5 < \frac{[Al_2O_3] + [M''_2O_3]}{M_2O} < 2$$

is adjusted in order to reduce the tendency of the base glass toward crystallization for subsequent thermal treatment processes.

8. Aluminoborosilicate glass according to claim 7, wherein a molar ratio of $$1.05 \leq \frac{Al_2O_3}{M_2O} \leq 1.1$$

is adjusted in the melt of the base glass.

9. Aluminoborosilicate glass according to claim 7, wherein the base glass contains between 15 and 30 mole % of $M_2O$, preferably $Na_2O$.

10. Aluminoborosilicate glass according to claim 7, wherein the base glass further comprises $Ag_2O$ in a concentration of up to 2 mole %.

11. Aluminoborosilicate glass according to claim 7, wherein lithium oxide has a proportion between 10% and 80% of the monovalent metal oxides.

12. Aluminoborosilicate glass according to claim 7, wherein an alkali fluoride or at least one oxide or fluoride of the metals zinc, magnesium, calcium, strontium, barium, niobium and tantalum are contained as admixtures in the base glass in concentrations of up to 3 mole %, respectively.

13. A method for producing crystallite-free GRIN lenses from the aluminoborosilicate glass of claim 7, the method comprising:
   melting the base glass of the indicated composition at temperatures of 1400° C.-1600° C. and homogenizing the molten glass;
   casting the molten glass for producing semifinished articles for optical components;
   shaping the semifinished articles to form blanks for the ion exchange, wherein the semifinished articles are reduced to dimensions suitable for the ion exchange; and
   ion exchange by introducing the blanks at least once into a molten salt in order to adjust a desired refractive index profile.

14. The method according to claim 13, wherein the blanks are produced by cutting plates from square semifinished articles of base glass and subsequently grinding or polishing until achieving a height that is equal to or slightly greater than the definitive lens height perpendicular to the optical axis.

15. The method according to claim 13, wherein the blanks are produced from bar-rod-shaped semifinished articles of the base glass by rod drawing at a temperature between 800° C. and 1000° C. and subsequent cutting, grinding or polishing until reaching a diameter that is equal to or slightly greater than the definitive lens diameter perpendicular to the optical axis.

16. The method according to claim 13, wherein the blanks are produced by cutting cubes from a square semifinished article of base glass and subsequently grinding and polishing until achieving a spherical shape whose diameter is equal to or slightly greater than the definitive lens diameter.

17. The method according to claim 13, wherein the blanks are produced directly from the melt of the base glass by means of a float glass process at a temperature between 800° C. and 1600° C. at a height that is equal to or slightly greater than the definitive lens height perpendicular to the optical axis.

18. The method according to claim 13, wherein, after the introduction of silver ions, the blanks are further produced by cutting the blanks and subsequent grinding or polishing until the desired final lens dimensions are achieved perpendicular to and in the direction of the optical axis.

19. The method of claim 18, wherein said aluminoborosilicate glasses are used as GRIN dispersive lenses.

20. The method of claim 18, wherein an exchange equilibrium was achieved during the introduction of silver, said use being as optical components with integrally increased refractive index level.

21. The method of claim 18, wherein said aluminoborosilicate glasses are used for beam shaping laser diodes.

22. The method of claim 18, wherein said aluminoborosilicate glasses are used as GRIN lenses for fiber-optic arrangements in communications technology or sensor technology.

23. The method of claim 18, wherein said aluminoborosilicate glasses are used as GRIN lenses for imaging beam paths and illumination beam paths in medical engineering, particularly in endoscopy.

24. The method according to claim 13, wherein silver ions are introduced in an ion exchange with alkali ions by introducing the blanks in a silver-containing molten salt at temperatures between 200° C. and 600° C. until a desired refractive index profile is adjusted.

25. The method according to claim 24, wherein, after the introduction of silver, the blanks are subjected to at least one additional ion exchange process in an alkali-containing melt in which there is a partial back-exchange of silver ions with monovalent metal ions, preferably sodium ions, after which the blanks are finished by cutting plates and subsequently grinding or polishing until achieving the desired definitive lens dimensions perpendicular to and in direction of the optical axis.

26. The method according to claim 25, wherein said aluminoborosilicate glasses are used as GRIN collecting lenses.

27. The method according to claim 25, wherein said aluminoborosilicate glasses are used as GRIN lenses for beam shaping of laser diodes.

28. The method according to claim 25, wherein said aluminoborosilicate glasses are used as GRIN lenses for fiber-optic arrangements in communications technology or sensor technology.

29. The method according to claim 25, wherein said aluminoborosilicate glasses are used as GRIN lenses for imaging beam paths and illumination beam paths in medical engineering, particularly in endoscopy.

30. The method according to claim 13, wherein a high proportion of lithium ions is introduced into the melt of the base glass as metal oxide and a partial exchange of lithium ions with other monovalent metal ions, preferably sodium ions, is carried out during the ion exchange in an alkali-containing melt until a desired refractive index profile is adjusted, and wherein the blanks are further produced by subsequently reducing the diameter until the desired definitive lens height is achieved perpendicular to the optical axis and by cutting and polishing until the definitive lens thickness is achieved in direction of the optical axis.

31. A method for producing crystallite-free GRIN lenses using an aluminoborosilicate glass of the following composition:

$20 \leq SiO_2 \leq 50$ mole %
$10 \leq M'''_2O_3 \leq 20$ mole % (M'''=B, Ga)
$10 \leq M_2O \leq 34$ mole % (M=Li, Na, K, Rb)
$10 \leq Al_2O_3 \leq 35$ mole % and adjustment of molar ratios to $$1 < \frac{Al_2O_3}{M_2O} < 1.3 \text{ and } 1.5 < \frac{[Al_2O_3] + [M''_2O_3]}{M_2O} < 2,$$

containing the following steps:

melting a base glass of the indicated composition at temperatures of 1400° C.-1600° C. and homogenizing the molten glass;

casting the molten glass for producing semifinished articles for optical components;

shaping the semifinished articles to form blanks for the ion exchange, wherein the semifinished articles are reduced to dimensions suitable for the ion exchange; and ion exchange by introducing the blanks at least once into a molten salt in order to adjust a desired refractive index profile.

32. The method according to claim 31, wherein the blanks are produced by cutting plates from square semifinished articles of base glass and subsequently grinding or polishing until achieving a height that is equal to or slightly greater than the definitive lens height perpendicular to the optical axis.

33. The method according to claim 31, wherein the blanks are produced from bar-rod-shaped semifinished articles of the base glass by rod drawing at a temperature between 800° C. and 1000° C. and subsequent cutting, grinding or polishing until reaching a diameter that is equal to or slightly greater than the definitive lens diameter perpendicular to the optical axis.

34. The method according to claim 31, wherein the blanks are produced by cutting cubes from a square semifinished article of base glass and subsequently grinding and polishing until achieving a spherical shape whose diameter is equal to or slightly greater than the definitive lens diameter.

35. The method according to claim 31, wherein the blanks are produced directly from the melt of the base glass by means of a float glass process at a temperature between 800° C. and 1600° C. at a height that is equal to or slightly greater than the definitive lens height perpendicular to the optical axis.

36. The method according to claim 31, wherein, after the introduction of silver ions, the blanks are further produced by cutting the blanks and subsequent grinding or polishing until the desired final lens dimensions are achieved perpendicular to and in the direction of the optical axis.

37. A method of using aluminoborosilicate glasses produced according to claim 36, said use being as GRIN dispersive lenses.

38. A method of using aluminoborosilicate glasses produced according to claim 36, wherein an exchange equilibrium was achieved during the introduction of silver, said use being as optical components with integrally increased refractive index level.

39. A method of using aluminoborosilicate glasses produced according to claim 36, said use being for beam shaping of laser diodes.

40. A method of using aluminoborosilicate glasses produced according to claim 36, said use being as GRIN lenses for fiber-optic arrangements in communications technology or sensor technology.

41. A method of using aluminoborosilicate glasses produced according to claim 36, said use being as GRIN lenses for imaging beam paths and illumination beam paths in medical engineering, particularly in endoscopy.

42. The method according to claim 31, wherein silver ions are introduced in an ion exchange with alkali ions by introducing the blanks in a silver-containing molten salt at temperatures between 200° C. and 600° C. until a desired refractive index profile is adjusted.

43. The method according to claim 42, wherein, after the introduction of silver, the blanks are subjected to at least one additional ion exchange process in an alkali-containing melt in which there is a partial back-exchange of silver ions with monovalent metal ions, preferably sodium ions, after which the blanks are finished by cutting plates and subsequently grinding or polishing until achieving the desired definitive lens dimensions perpendicular to and in direction of the optical axis.

44. A method of using aluminoborosilicate glasses produced according to claim 43, said use as GRIN collecting lenses.

45. A method of using aluminoborosilicate glasses produced according to claim 43, said use as GRIN lenses for beam shaping of laser diodes.

46. A method of using aluminoborosilicate glasses produced according to claim 43, said use as GRIN lenses for fiber-optic arrangements in communications technology or sensor technology.

47. A method of using aluminoborosilicate glasses produced according to claim 43, said use as GRIN lenses for imaging beam paths and illumination beam paths in medical engineering, particularly in endoscopy.

48. The method according to claim 31, wherein a high proportion of lithium ions is introduced into the melt of the base glass as metal oxide and a partial exchange of lithium ions with other monovalent metal ions, preferably sodium ions, is carried out during the ion exchange in an alkali-containing melt until a desired refractive index profile is adjusted, and wherein the blanks are further produced by subsequently reducing the diameter until the desired definitive lens height is achieved perpendicular to the optical axis and by cutting and polishing until the definitive lens thickness is achieved in direction of the optical axis.

* * * * *